3,498,971
PROCESS FOR THE PREPARATION OF SODIUM CARBOXYMETHYLCELLULOSE
Aurel Blaga, Ottawa, Ontario, Canada, and Colin R. McArthur, Camillus, N.Y., assignors to Allied Chemical Corporation, New York, N.Y., a corporation of New York
Filed Feb. 13, 1967, Ser. No. 615,566
Int. Cl. C08b 11/00
U.S. Cl. 260—231                 9 Claims

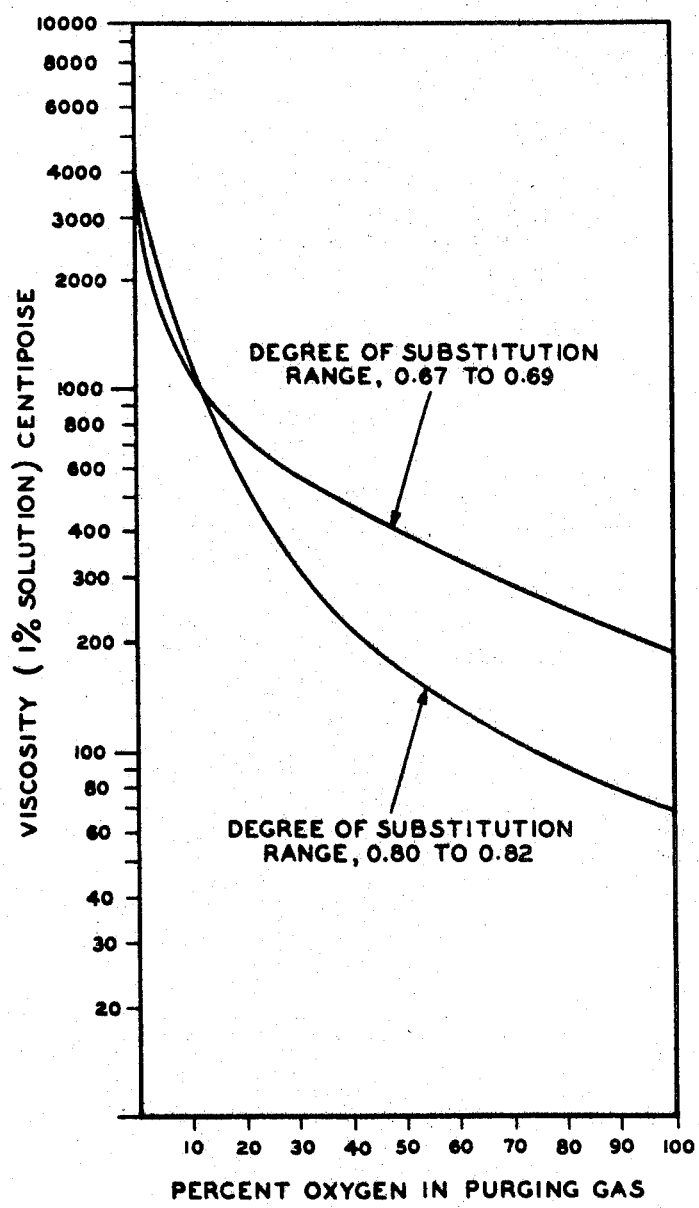
VISCOSITY OF 1% SODIUMCARBOXYMETHYLCELLULOSE
VERSUS % OXYGEN IN PURGING GAS
INVENTORS:
AUREL BLAGA
COLIN R. McARTHUR
BY
ATTORNEY United States Patent Office 3,498,971
Patented Mar. 3, 1970

ABSTRACT OF THE DISCLOSURE

A process for the preparation of sodium carboxymethylcellulose of desired viscosity by conducting any or all of the different stages of alkalization or etherification employed in a slurry process preparation of carboxymethylcellulose in an atmosphere containing predetermined proportions of oxygen. Purging gas mixtures containing from 0 to 100% oxygen are added during the alkalization, etherification or throughout the duration of a slurry process for the preparatin of sodium carboxymethylcellulose involving the known reaction of cellulose, alkali and etherifying agent.

---

This invention relates to an improved slurry process for the preparation of sodium carboxymethylcellulose. More particularly, the present invention relates to a novel process for the preparation of sodium carboxymethylcellulose (CMC) wherein the sodium CMC is of various degrees of substitution and has a wide range of viscosities (1% aqueous solutions: 68–3900 cps.) and wherein the viscosity can be efficiently controlled.

Viscosity and degree of substitution are two of the major properties of a cellulose derivative, such as cellulose ethers, which determine its utility. The degree of substitution (D.S.) in this case is defined as the average number of carboxymethyl groups substituted per unit of anhydroglucose and is largely determined by the identities and ratios of the various reactants.

Heretofore, viscosity of cellulose ethers has been regulated in a number of ways. One procedure involves the use of a special cellulose having the requisite degree of polymerization to produce each viscosity type. This is highly undesirable since a special type of cellulose must be kept on hand for each viscosity type of cellulose that is desired to prepare. Furthermore, in the preparation of cellulose of extra low degree of polymerization there is generally a loss of some of the cellulose with consequent increase in production cost.

Another method of controlling viscosity of a cellulose ether, such as carboxyalkyl derivatives of cellulose, more specifically sodium CMC, involves the aging of the ether in the presence of air. In order to be effective, the aging must be carried out for a period of at least several hours and in some instances as long as two days. This is obviously disadvantageous because of the long period of time required for the degradation of the cellulose and the attendant slowing down of the process. Additionally, the exact control of time, temperature, caustic conditions, etc., required because of the sensitivity of cellulose to these influences is very difficult to attain and is frequently inadequate even under the best of conditions.

The addition of hydrogen peroxide and the alkali metal hypobromites, hypochlorites, hypoiodates, peroxides or periodates to the etherification mixture has been suggested, and the addition of such compounds gives good viscosity control in the so-called "dough" process in which cellulose is reacted with a carboxyalkyl etherifying agent in the presence of free alkali and water. However, in the slurry process for manufacturing cellulose ethers, such as carboxymethylcellulose and the like, involving the use in the reaction mixture of a diluent, for example, a low boiling aliphatic alcohol, such as isopropanol, it has generally been considered that the addition of such compounds to the reaction mixture does not produce the same degree of viscosity control as in the "dough" process.

Another method involves the hydrolysis of the cellulose ethers by heating in the presence of acids. Such hydrolysis is undesirable since it results in the formation of products which are usually unstable.

In addition to the foregoing methods, the prior art also mentions the use of air or oxygen but further states that this method is not entirely satisfactory since the control of the viscosity is not good.

Other methods revealed in the prior art are either uneconmical or result in discolored products. There is therefore a continued need in the art for a method of regulating the viscosity of CMC which is economical and is not accompanied by undesired features such as discoloration of products.

It is a further object of this invention to provide a process for the preparation of sodium CMC in which the viscsity of the resulting product can be closely regulated, thereby producing sodium CMC with a pre-determined viscosity.

It is another object of this invention to provide a process for the preparation of sodium CMC which has an improved color.

It is a further object of this invention to provide a process for the preparation of sodium CMC which when dissolved in water yields aqueous solutions which have excellent clarity and extremely low fiber content.

Despite the contrary teaching of the above-mentioned prior art, we have found that the viscosity of carboxymethylcellulose of a given degree of substitution can be controlled by conducting any or all of the different stages of alkalization or etherification employed in a slurry process preparation of carboxymethylcellulse in an atmosphere containing predetermined proportions of oxygen by using the method described hereinbelow.

For example, purging gas mixtures containing from 0 to 100% oxygen, preferably from about 5 to about 75% oxygen by volume, may be added during the alkalization, etherification or throughout the duration of a slurry process for the preparation of sodium carboxymethylcellulose involving the well-known reaction of cellulose, alkali and an etherifying agent.

The concentration of oxygen employed will be determined by the viscosity desired in the final product since, as will be seen from the examples that follow, sodium carboxymethylcellulose of various degrees of substitution and having a wide range of viscosities may be prepared by the present process. Thus for example, the viscosity of 1% aqueous solutions of sodium CMC prepared herein may vary from 68 to 3900 cps., depending on the concentration of oxygen employed. The graphs of 1% aqueous solutions of different degrees of substitution are illustrated in the accompanying drawing. This graph shows the percentage of oxygen which must be present in the purging gas to produce sodium carboxymethylcellulose of the desired viscosity.

The following examples are illustrative of the present invention.

Example 1

Isopropyl alcohol (866.0 grams) and water (160.8 grams) were added to a 2-liter, four-necked resin kettle equipped with a mechanical stirrer, thermometer, reflux condenser and a capillary (which extended ½ inch from the bottom of reactor). A gas mixture consisting of 95% nitrogen and 5% oxygen (by volume) was introduced through the capillary tube at a rate of 160.0 ml./min. for 5 minutes. The stream of gas was maintained at this flow rate during subsequent steps. To the stirred liquid kept at about 25° C. was added flocked cellulose (104.9 grams of cellulose containing 4.6% water; 100 grams of dried cellulose; 0.617 mole of anhydroglucose units) over a period of 3–4 minutes. The resulting slurry was stirred for 10 minutes. Fifty percent aqueous sodium hydroxide solution (123.0 grams) was added over a period of 5 minutes, while the temperature of the reaction mixture was maintained at 25.0±0.5° C. Stirring was continued for ½ hour (alkalization period), then monochloroacetic acid (64.0 grams; 0.6776 mole) was added over a period of one minute and the temperature was gradually raised to 65° C. during ½ hour. The mixture was kept at 65° for 2 hours (etherification period) with vigorous agitation. At the end of this period, the mixture was cooled rapidly (5–6 minutes) by means of an ice-bath to 20–25° C. The stream of oxygen-containing gas was stopped and the slurry was filtered. The crude carboxymethylcellulose was slurried with about 1040 grams of 70% aqueous methanol at ambient temperature for 15 minutes, and then the slurry was neutralized with dilute hydrochloric acid to the phenolphthalein endpoint. The product was separated by filtration, slurry-washed first with 1040 grams of 70% aqueous methanol and then with 1040 grams of anhydrous methanol. The white cake was air-dried at room temperature (about 15 hours). Drying under reduced pressure (15 inches mercury) at 60° C. for 6 hours gave 144.7 grams of sodium carboxymethylcellulose assaying 3.5% water.

The degree of substitution (D.S.), which was determined by the uranyl nitrate method of C. V. Francis in Analytical Chemistry, 25, 941, 1953, was 0.82; the reaction efficiency (R.E.) was 74.6%. The product had a Hunter Whiteness of 84.7 and dissolved readily in water to yield a clear, fiber-free solution. The viscosity of a 1% aqueous solution was 2,000 cps.

Examples 2–6

The procedure of Example 1 was duplicated but the concentration of oxygen was varied. Results are shown in Table 1.

Example 7

The procedure of Example 4 was repeated but the alkalization step was carried out at 50° C.; the alkalization temperature for the other experiments was 25° C. Results are shown in Table I.

cation temperature for the other experiment was 65° C. The results are shown in Table I.

Examples 9–13

The procedure of Examples 1–6 were duplicated but the conditions were modified to give carboxymethylcellulose of degree of substitution in the range 0.67–0.69. This was done by adjusting the quantities of raw materials as follows: 104.9 grams of cellulose containing 4.6% water, 953.0 grams of isopropyl alcohol (0.02% water), 110.7 grams water, 43.0 grams of sodium hydroxide dissolved in 43.0 grams of water, and 44.8 grams of monochloroacetic acid. The examples showed an analogous correlation between oxygen concentration and product viscosity. Results are shown in Table I.

Examples 14 to 19 illustrate that the time, temperature, amounts of reactants and other conditions may be varied and still remain within the scope and spirit of the invention, that is, it is still possible to regulate the viscosty of the sodium carboxymethylcellulose produced.

Example 14

Isopropyl alcohol (949.8 grams) and water (94.5 grams) were added to a 2-liter, four-necked resin kettle equipped with a mechanical stirrer, thermometer, reflux condenser and a capillary (which extended ½ inch from the bottom of reactor). A gas mixture consisting of 90% nitrogen and 10% oxygen (by volume) was introduced through the capillary tube at a rate of 160.0 ml./min. for 5 minutes. The stream of gas was maintained at this flow rate during subsequent steps. To the stirred liquid kept at about 25° C. was added flocked cellose (104.9 grams of cellulose containing 4.6% water; 100 grams of dried cellulose; 0.617 mole of anhydroglucose units) over a period of 3–4 minutes. The resulting slurry was stirred for 5 minutes. Fifty percent aqueous sodium hydroxide solution (100.8 grams) was added over a period of 1 minute, while the temperature of the reaction mixture increased to 32° C. Stirring was continued for 10 minutes (alkalization period), then monochloroacetic acid (58.3 grams; 0.555 mole) was added over a period of one minute and the temperature was gradually raised to 75° C. during 10 min. The mixture was kept at 75° C. for 50 min. (etherification period) was vigorous agitation. At the end of this period, the mixture was cooled rapidly (5–6 minutes) by means of an ice-bath to 20–25° C. The stream of oxygen-containing gas was stopped and the slurry was filtered. The crude carboxymethylcellulose was slurried with about 1040 grams of 70% aqueous methanol at ambient temperature for 15 minutes, and then the

TABLE 1

| Example | Oxygen content of the purging gas (vol. percent) | Viscosity [2] at 25° C. (cps.) 1% aqueous solution | D.S.[3] | R.E.[4] | Hunter whiteness | Property of aqueous solutions (1%) |
| --- | --- | --- | --- | --- | --- | --- |
| 1 | 5.0 | 2,000 | 0.82 | 74.6 | 84.7 | Clear and fiber-free. |
| 2 [1] | 0.0 | 3,900 | 0.82 | 74.6 | 72.0 | Do. |
| 3 | 10.0 | 1,400 | 0.81 | 73.6 | 87.2 | Do. |
| 4 | 21.0 | 400 | 0.80 | 72.7 | 87.4 | Do. |
| 5 | 50.0 | 190 | 0.81 | 73.6 | 90.2 | Do. |
| 6 | 100.0 | 68 | 0.81 | 73.6 | 91.0 | Do. |
| 7 | 21.0 | 480 | 0.75 | 68.2 | 87.7 | Do. |
| 8 | 21.0 | 430 | 0.79 | 71.8 | 84.0 | Do. |
| 9 [1] | 0.0 | 3,900 | 0.67 | 87.0 | 62.6 | Contained traces of fibers. |
| 10 | 5.0 | 1,400 | 0.69 | 89.7 | 76.6 | Clear and fiber-free. |
| 11 | 21.0 | 680 | 0.67 | 87.0 | 81.3 | Do. |
| 12 | 50.0 | 430 | 0.69 | 89.7 | 81.8 | Do. |
| 13 | 100.0 | 170 | 0.69 | 89.7 | 83.5 | Do. |

[1] The purging gas used in these experiments was prepurified nitrogen; it contained about 8 p.p.m. oxygen (i.e. about 8×10⁻⁴ vol. percent).
[2] The viscosity was determined in accordance with the procedure described in ASTM 1439-63T (latest revision in 1963).
[3] D.S.: Degree of Substitution.
[4] R.E.: Reaction Efficiency is defined as that percentage of chloroacetic acid which reacts with alkali cellulose to form CMC.

Examples 8

The procedure of Example 4 was duplicated but the etherification step was carried out at 75° C.; the etherification slurry was neutralized with dilute hydrochloric acid to the phenolphthalein endpoint. The product was separated by filtration, slurry-washed first with 1040 grams of 70% aqueous methanol and then with 1040 grams of anhydrous methanol. The white cake was air-dried at room temperature (about 15 hours). Drying under reduced pressure (15 inches mercury) at 60° C. for 16 hours gave 145.3 grams of sodim carboxymethylcellulose assaying 6.3% water.

The degree of substitution, which was determined by the perchloric acid method (ASTM D1439–63T), was 0.72; the reaction efficiency was 80%. The product had a Hunter Whiteness of 79 and dissolved readily in water to yield a clear, fiber-free solution. The viscosity of a 1% aqueous solution was 1400 cps.

Examples 15–19

The procedure of Example 14 was duplicated but the concentration of oxygen was varied. Results are shown in Table II.

TABLE 2

| Ex. | Oxygen content of the purging gas (vol. percent) | Viscosity [2] at 25° C. (cps.) 1% aqueous solution | D.S.[3] | R.E.[4] | Hunter whiteness | Property of aqueous solutions (1%) |
|---|---|---|---|---|---|---|
| 14 [1] | 0.0 | 2,400 | 0.73 | 81.1 | 69.7 | Clear and fiber-free. |
| 15 | 5.0 | 1,700 | 0.75 | 83.3 | 76.2 | Do. |
| 16 | 10.0 | 1,400 | 0.72 | 80.0 | 79.0 | Do. |
| 17 | 21.0 | 900 | 0.73 | 81.1 | 80.3 | Traces of fibers. |
| 18 | 50.0 | 490 | 0.75 | 83.3 | 82.0 | Clear and fiber-free |
| 19 | 100.0 | 200 | 0.72 | 80.0 | 85.0 | Do. |

[1] The purging gas used in these experiments was prepurified nitrogen; it contained about 8 p.p.m. oxygen (i.e. about $8 \times 10^{-4}$ vol. percent).
[2] The viscosity was determined in accordance with the procedure described in ASTM 1439–63T (latest revision in 1963).
[3] D.S.: Degree of Substitution determined in accordance with the procedure described in ASTM D1439–63T.
[4] R.E.: Reaction Efficiency is defined as that percentage of chloroacetic acid which reacts with alkali cellulose to form CMC.

The following Examples 20, 21 and 22 show that it is not critical to add the oxygen during any one specific stage of the process. Thus, in Example 20, the oxygen is added only during the alkalization, in Example 21, the oxygen is added during both the alkalization and etherification steps and in Example 22, only during the etherification. It should be noted that satisfactory regulatory results are obtained using all three procedures.

Example 20

Isopropyl alcohol (949.8 grams) and water (94.5 grams) were added to a 2-liter, four-necked resin kettle equipped with a mechanical stirrer, thermometer, reflux condenser and a capillary (which extended ½ inch from the bottom of reactor). A gas mixture consisting of pure oxygen was introduced through the capillary tube at a rate of 160.0 ml./min. for 5 minutes. The stream of gas was maintained at this flow rate during subsequent steps. To the stirred liquid kept at about 25° C. was added flocked cellulose (104.9 grams of cellulose containing 4.6% water; 100 grams of dried cellulose; 0.617 mole of anhydroglucose units) over a period of 3–4 minutes. The resulting slurry was stirred for 5 minutes. Fifty percent aqueous sodium hydroxide solution (100.8 grams) was added over a period of 1 minute, while the temperature of the reaction mixture increased to 32° C. Stirring was continued for 25 min. (alkalization period), then monochloroacetic acid (58.5 grams; 0.555 mole) was added over a period of one minute and the temperature was gradually raised to 75° C. during 5 min. The mixture was kept at 75° C. for 25 min. (etherification period) with vigorous agitation. At the end of this period, the mixture was cooled rapidly (5–6 minutes) by means of an ice-bath to 20–25° C. The stream of oxygen-containing gas was stopped and the slurry was filtered. The crude carboxymethylcellulose was slurried with about 1040 grams of 70% aqueous methanol at ambient temperature for 15 minutes, and then the slurry was neutralized with dilute hydrochloric acid to the phenolphthalein endpoint. The product was separated by filtration, slurry-washed first with 1040 grams of 70% aqueous methanol and then with 1040 grams of anhydrous methanol. The white cake was air-dried at room temperature (about 15 hours). Drying under reduced pressure (15 inches mercury) at 60° C. for 6 hours gave 140.4 grams of sodium carboxymethylcellulose assaying 5.0% water.

The degree of substitution, which was determined by the perchloric acid method (ASTM D1439–63T), was 0.71; the reaction efficiency was 78.9%. The product had a Hunter Whiteness of 82.3. The viscosity of a 1% aqueous solution was 280 cps.

Example 21

Isopropyl alcohol (949.8 grams) and water (94.5 grams) were added to a 2-liter, four-necked resin kettle equipped with a mechanical stirrer, thermometer, reflux condenser and a capillary (which extended ½ inch from the bottom of reactor). A gas mixture consisting of pure oxygen was introduced through the capillary tube at a rate of 160.0 ml./min. After 5 min, flocked cellulose (104.9 grams of cellulose containing 4.6% water; 100 grams of dried cellulose; 0.617 mole of anhydroglucose units) was added over a period of 3–4 minutes to the stirred liquid kept at about 25° C. The resulting slurry was stirred for 5 minutes. Fifty percent aqueous sodium hydroxide solution (100.8 grams) was added over a period of 1 minute, while the temperature of the reaction mixture increased to 32° C. Stirring was continued for 25 min. (alkalization period). The stream of oxygen was then stopped and replaced by a stream of nitrogen (160 ml./min.). Then, monochloroacetic acid (58.5 grams; 0.555 mole) was added over a period of one minute and the temperature was gradually raised to 75° C. during 5 min. The mixture was kept at 75° C. for 25 min. (etherification period) with vigorous agitation. At the end of this period, the mixture was cooled rapidly (5–6 minutes) by means of an ice-bath to 20–25° C. The stream of oxygen-containing gas was stopped and the slurry was filtered. The crude carboxymethylcellulose was slurried with about 1040 grams of 70% aqueous methanol at ambient temperature for 15 minutes, and then the slurry was neutralized with dilute hydrochloric acid to the phenolphthalein endpoint. The product was separated by filtration, slurry-washed first with 1040 grams of 70% aqueous methanol and then with 1040 grams of anhydrous methanol. The white cake was air-dried at room temperature (about 15 hours). Drying under reduced pressure (15 inches mercury) at 60° C. for 6 hours gave 142.9 grams of sodium carboxymethylcellulose assaying 7.1% water.

The degree of substitution, which was determined by the perchloric acid method (ASTM D1439–63T), was 0.69; the reaction efficiency was 76.7%. The product had a Hunter Whiteness of 71.3. The viscosity of a 1% aqueous solution was 600 cps.

Example 22

Isopropyl alcohol (949.8 grams) and water (94.5 grams) were added to a 2-liter, four-necked resin kettle equipped with a mechanical stirrer, thermometer, reflux condenser and a capillary (which extended ½ inch from the bottom of reactor). A gas mixture consisting of nitrogen was introduced through the capillary tube at a rate of 160.0 ml./min. for 5 minutes. After 5 min., flocked cellulose (104.9 grams of cellulose containing 4.6% water; 100 grams of dried cellulose; 0.617 mole of anhydroglucose units) was added over a period of 3–4 minutes to the stirred liquid kept at about 25° C. The resulting slurry was stirred for 5 minutes. Fifty percent aqueous sodium hydroxide solution (100.8 grams) was added over a period of 1 minute, while the temperature of the reaction mixture increased to 32° C. Stirring was continued for 25 min. (alkalization period). The stream of nitrogen was then stopped and replaced by a stream of oxygen (160 ml./min.). Monochloroacetic acid (58.5 grams; 0.555 mole) was added over a period of one minute and the temperature was gradually raised to 75° C. during 5 min. The mixture was kept at 75° C. for 25 min. (etherification period) with vigorous agitation. At the end of this period, the mixture was cooled rapidly (5–6 minutes) by means of an ice-bath to 20–25° C. The stream of oxygen-containing gas was stopped and the slurry was filtered. The crude carboxymethylcellulose was slurried with about 1040 grams of 70% aqueous methanol at ambient temperature for 15 minutes, and then the slurry was neutralized with dilute hydrochloric acid to the phenolphthalein endpoint. The product was separated by filtration, slurry-washed first with 1040 grams of 70% aqueous methanol and then with 1040 grams of anhydrous methanol. The white cake was air-dried at room temperature (about 15 hours). Drying under reduced pressure (15 inches mercury) at 60° C. for 6 hours gave 142.2 grams of sodium carboxymethylcellulose assaying 6.4% water.

The degree of substitution, which was determined by the perchloric acid method (ASTM D1439–63T), was 0.71; the reaction efficiency was 78.9%. The product had a Hunter Whiteness of 79.8. The viscosity of a 1% aqueous solution was 600 cps.

It will be apparent to those skilled in the art that the present invention should not be construed as limited to the examples and range of process conditions described in the above examples. Many variations in procedures and compositions may be made without departing from the spirit and scope of the invention.

The process of the present invention may be applied to prepare sodium carboxymethylcellulose of a degree of substitution ranging from 0.1 to 3.0.

The flow rate of the oxygen containing gas may range from about 20 to about 1000 ml./min./100 grams of dry starting cellulosic material.

Inert gas other than nitrogen (for example, argon, helium, etc.) may be used in conjunction with the oxygen.

The temperature used during the alkalization and etherification may range from 10 to 50° C. and from 50 to 85° C., respectively; the preferred temperature ranges for the alkalization and etherification are 20 to 30° C. and 60 to 75° C., respectively.

The process may be carried out also in reaction media other than aqueous isopropyl alcohol. Examples of suitable reaction media (diluent systems are aqueous t-butyl alcohol and aqueous methanol. Other liquids which may be used with water as a reaction medium are ethanol, n-propyl alcohol, N-butyl, sec-butyl alcohol, isobutyl alcohol, dioxane, n-amyl alcohol, acetone, petroleum ether and benzene.

The present invention may also be carried out using a three-component, two-phase liquid medium consisting of water, an organic liquid miscible with water and an organic liquid substantially immiscible with water. The organic liquid miscible with water may be analiphatic alcohol having from 2 to 5 carbon atoms, acetone, dioxane, etc. The liquid immiscible (or substantially immiscible) with water may be chosen from the group consisting of aromatic hydrocarbons, aliphatic hydrocarbons or chlorinated hydrocarbons.

Because of the many variations in procedures and compositions which may be made without departing from the spirit and scope of the invention, the invention will be limited only by the following claims.

We claim:
1. In a process for the preparation of sodium carboxymethylcellulose by effective reaction of a mixture comprising cellulose, an alkali, and an etherifying agent in a slurrying medium, the improvement comprising continuously adding an oxygen containing gas at a flow rate in the range of about 20 to about 1000 ml./minute/100 grams of dry starting cellulose material whereby the viscosity of the sodium carboxymethylcellulose produce is effectively regulated.
2. A process according to claim 1 wherein said gas is an inert gas containing at least about 5% oxygen.
3. A process according to claim 1 wherein said oxygen is molecular oxygen.
4. A process according to claim 2 wherein oxygen is added in a concentration of from 5% to 75%, by volume.
5. A process according to claim 1 wherein the slurrying medium is a lower aliphatic alcohol.
6. A process according to claim 1 wherein the slurrying medium is isopropyl alcohol.
7. A process according to claim 1 wherein said inert gas is notrogen.
8. A process according to claim 1 wherein said alkali is aqueous sodium hydroxide.
9. A process according to claim 1 wherein said etherifying agent is monochloroacetic acid.

References Cited
UNITED STATES PATENTS

| | | | |
|---|---|---|---|
| 2,512,338 | 6/1950 | Klug et al. | 260—231 |
| 2,523,377 | 8/1950 | Klug | 260—231 |
| 2,841,579 | 7/1958 | Villefroy et al. | 260—233 |
| 2,912,431 | 11/1959 | Leonard et al. | 260—232 |
| 3,296,248 | 1/1967 | Mitchell | 260—232 |
| 2,858,304 | 10/1958 | Bradshaw et al. | 260—233 |
| 2,991,281 | 7/1961 | Bradshaw et al. | 260—233 |

HOSEA E. TAYLOR, JR., Primary Examiner

M. I. MARQUIS, Assistant Examiner

P.S. Cl. X.R.

260—232, 233; 106—197